United States Patent [19]

Behrens

[11] Patent Number: 4,954,169
[45] Date of Patent: Sep. 4, 1990

[54] FINE-GRAINED, HIGH-PURITY EARTH ACID METAL POWDERS, A PROCESS FOR THEIR PRODUCTION AND THEIR USE

[75] Inventor: Dieter Behrens, Bad Harzburg, Fed. Rep. of Germany

[73] Assignee: Bayer Aktiengesellschaft, Leverkusen, Fed. Rep. of Germany

[21] Appl. No.: 364,844

[22] Filed: Jun. 12, 1989

[30] Foreign Application Priority Data

Jun. 22, 1988 [DE] Fed. Rep. of Germany ....... 3820960

[51] Int. Cl.$^5$ ............................................... B22F 1/00
[52] U.S. Cl. ......................................... 75/228; 75/364; 419/2; 419/23; 419/63; 204/292; 420/425; 420/427
[58] Field of Search ................. 75/0.5 A, 0.5 BB, 84, 75/228, 251, 253; 419/2, 23, 63; 204/292

[56] References Cited

U.S. PATENT DOCUMENTS

| | | | |
|---|---|---|---|
| 4,141,720 | 12/1979 | Vartanian | 75/0.5 BB |
| 4,347,084 | 8/1982 | Hähn et al. | 75/245 |
| 4,483,819 | 11/1984 | Albrecht et al. | 419/2 |
| 4,687,632 | 8/1987 | Hurd et al. | 419/45 |
| 4,786,319 | 11/1988 | Zeiringer | 75/10.62 |

*Primary Examiner*—Stephen J. Lechert, Jr.
*Assistant Examiner*—Nina Bhat
*Attorney, Agent, or Firm*—Connolly and Hutz

[57] ABSTRACT

Earth acid metal powders, such as tantalum or niobium, useful in the production of electrolytic capacitors and other electronic components, are agglomerates of sintered compacts, wherein the mean grain size of the agglomerates is no more than 2.0 μm, determined by the Fisher Sub-Sieve Sizer, and wherein the agglomerates consist of primary individual agglomerated particles of mean grain size of no more than 0.7 μm.

18 Claims, No Drawings

FINE-GRAINED, HIGH-PURITY EARTH ACID METAL POWDERS, A PROCESS FOR THEIR PRODUCTION AND THEIR USE

This invention relates to earth acid metal powders consisting of agglomerates for powder metallurgical applications for the production of sintered compacts, to a process for their production and to their use.

BACKGROUND OF THE INVENTION

In DE-A 37 06 853, a process is disclosed wherein inter alia potassium heptafluorotantalate is introduced into an inert salt melt at a temperature above 600° C., earth acid metals are obtained metallothermically from complex halides of the earth acid metals by reduction with alkali or alkaline earth metals at temperatures at which the salts involved in the reaction are present in molten form.

According to DE-A 37 06 853, the exothermic reduction reaction results in heating of the reaction mixture to beyond 700° C. Thereafter, the reaction is sustained for another 4.5 hours at 850° C., the salt melt being stirred together with the tantalum sediment.

In one particular Example of this patent specification, the addition of alkali metal and tantalum salts is spread over several individual steps and the final temperature is kept at 730° C.

In this process, the tantalum salt and the reduction metal are generally introduced continuously into the reactor in partial quantities to control the temperature conditions prevailing during the exothermic reaction of the components.

One feature common to the state-of-the-art processes is that the starting material is generally a salt melt which, to control the highly exothermic reaction, mostly contains inert diluting salts and in which the tantalum salt (potassium heptafluorotantalate) is always present in molten form before the reduction metal is introduced.

In every case, the reaction temperatures are at least above 600° C. and the stirred salt melt is always kept at elevated temperature for a certain time to guarantee complete reaction of the reactants. However, although another requirement is that the maximum temperature of the reaction mixture be kept as low as possible, the resulting end products always consist—after cooling of the salt melts—of compact material in the form of solid alkali salt lumps in which the metal powders are unevenly distributed and which always have to be size-reduced by crushing and grinding before they are subjected to washing.

Accordingly, the state-of-the-art processes for the production of valve metal powders have various disadvantages of which the following are particularly important in connection with the problem addressed by the present invention:

The fusion of the components (inert salts and earth acid metal complex salts) requires temperatures which in turn necessitate heat-resistant and corrosion-resistant reactor materials. The stirring of the melt naturally leads to abrasion of the crucible wall material and to contact between the tantalum powder formed and the reactor wall, resulting in harmful metallic impurities in the product from the crucible material. In addition, the metal powder particles are compacted by thermal and mechanical effects (forging effects) in a stirred salt melt and, as a result, undergo unwanted surface losses.

State-of-the-art processes in which the salt melt is not mechanically moved suffer from the drawback of an incomplete reaction of the reactants and require a large excess of reducing agents or correspondingly long residence times at high temperatures.

Accordingly, extremely pure earth acid metal powders require high operational outlay for their production, for example through the use of inlets of special metal sheets inside the reactor. However, these inlets have only limited useful lives and, in addition, are extremely expensive.

The equally well-known "paste processes", for example according to DE-C 25 17 180, in which the reactants are reacted in the form of a paste-form mixture by initial ignition and have to be kept at a relatively high temperature for a while without stirring, lead to spontaneous overheating of the reaction mixture on ignition, accompanied by fusion of the salts involved. The reaction kinetics cannot be controlled. As mentioned above, the long residence times of the crude powder in the hot salt melt again lead to coarse tantalum powders of which the means grain sizes, as measured by the air penetration method (FISHER SUB-SIEVE SIZER, ASTM B 330/82), exceed values of 1 micrometer in every case.

Accordingly, the object of the present invention is to provide high-purity earth acid metal powders which have a relatively small mean grain size without any of the disadvantages of the metal powders produced by known processes for capacitor applications.

BRIEF DESCRIPTION OF THE INVENTION

It has now been found that these requirements are eminently satisfied by earth acid metal powders in the form of agglomerates which are characterized in that the mean grain size of the agglomerates is no more than 2.0 $\mu$m and preferably no more than 1.7 $\mu$m and in that the agglomerates consist of primary individual particles of which the mean grain size is no more than 0.7 $\mu$m (as determined using a FISHER SUB-SIEVE SIZER).

DETAILED DESCRIPTION OF THE INVENTION

The earth acid metal powders of the present invention are produced by a process which comprises reacting alkali-earth acid double halides or earth acid halides with an alkali metal wherein the reaction is carried out without the need of a salt melt as in the prior art. Thus the detriments which attend the use of salt melt processes are avoid in the present invention. The present invention relates to these earth acid metal powders.

They are characterized by special properties in terms of their chemical purity, their small particle size, their large specific surface and their very good flow behavior during powder metallurgical processing.

In one preferred embodiment, 100% of the agglomerates pass through a 250 $\mu$m mesh sieve.

The earth acid metal powders according to the invention preferably have a total alkali content of at most 30 ppm, their potassium content not exceeding 10 ppm. In addition, they preferably have a total content of iron, chromium and nickel of at most 30 ppm, their chromium and nickel contents not exceeding 5 ppm in either case. The particularly preferred earth acid metal is tantalum.

It has been found that the earth acid metal powders according to the invention can be obtained from earth acid metal salts by any of the known alkali-metallothermic reduction processes normally used by holding the reaction temperature during the exothermic reaction of the earth acid salts with the reduction metal in such a way that no molten phases of the salts involved in the reaction occur within the reaction batch.

Accordingly, the present invention also relates to a process for the production of the earth acid metal powders according to the invention by reaction of alkali/earth acid double halides and/or earth acid halides with alkali metal, optionally with addition of inert salts in the form of alkali halides, characterized in that the reaction is carried out in such a way that the reaction mixture is not present as a melt.

In one preferred embodiment of the process according to the invention, tantalum and/or niobium salts are used and the reaction is carried out at temperatures below 600° C. and preferably at temperatures in the range from 400° to 600° C.

Particularly good results are obtained when the tantalum salts are alkali heptafluorotantalates, the niobium salts are alkali heptafluoroniobates and the reduction metals are liquid alkali metals.

The non-molten reaction mixture is preferably stirred during the reduction of earth acid metal salts with liquid alkali metal to guarantee uniform and complete reaction of the reactants.

In one particularly preferred embodiment of the process according to the invention, the tantalum salt is potassium heptafluorotantalate and the reduction metal is liquid sodium. However, it is also possible with advantage to use sodium heptafluorotantalate as the tantalum salt.

Direct mechanical action on the primary metal particles during stirring is avoided by the fact that, in the course of their formation, the primary metal particles are encapsulated in solid alkali halide and are thus surrounded by solid, protective alkali salt shell. Surprisingly, the cooled reaction mass is also of a brittle, granular and free-flowing consistency which enables it to be introduced as loose material into the usual washing process.

After the crude products have been washed by known methods to remove the accompanying alkali halides, very fine and extremely large-surface earth acid metal powders are obtained. After washing, the earth acid metal powder is subjected to an oxidizing acid treatment to elute any water-insoluble impurities. The earth acid metal powder obtained from the elution process may then be subjected to a gentle, thermal after-treatment, for example to deoxidizing agglomeration (for example in accordance with DE-C 31 30 392).

The earth acid metal powder obtained after washing has mean grain sizes (as measured by FSSS) of less than 0.7 micrometers.

The use of the fine, high-purity earth acid metal powders according to the invention affords advantages in any applications of which the requirements have not hitherto been satisfied by the currently available earth acid metal powders.

Finely disperse composite materials and pseudo-alloys produced by powder-metallurginal methods require very fine and pure starting materials. Niobium-containing superconductors of the metallic type are mentioned here.

In the production of targets for the surface metallization of microelectronic components, purity has to satisfy extremely exacting requirements which are fulfilled by the earth acid metal powders according to the invention.

However, high-purity, fine earth acid metal powders are also required for the melt- or sinter-metallurgical production of semifinished products, such as wire, sheet and foil.

However, the special potential applications in the production of electrolytic capacitors, particularly tantalum capacitors, are of particular significance.

Accordingly, the present invention also relates to the use of the earth acid metal powders according to the invention for the production of electrolytic capacitors.

The invention is illustrated by the following Examples. However, the choice made should not be regarded as in any way limiting the other possibilities of the process.

EXAMPLE 1

Substantially stoichiometric quantities of $K_2TaF_7$ activated (decrepitated) with a 2% excess of reduction metal and sodium metal were mixed in an extruder mixer of the type used in the above-cited DE-C 2 517 180 (Example 1) and the resulting mixture introduced in portions of 1 kg into crucibles which were transported slowly in an inert gas atmosphere into an electrically heated heating zone on a circulating conveyor belt. The heating zone was adjusted to an increasing temperature profile which rose from 300° C. to 500° C. During the slow passage through the heating zone, the reactants reacted slowly with one another without the reaction mixture entering into the molten state. Measurement by infrared sensor revealed a maximum surface temperature of the reaction mass of approximately 580° C. After passing through the cooling zone of the recirculation furnace, a sponge-like conglomerate of alkali salt and tantalum metal was obtained and could readily be converted into a pourable consistency by crushing. The salt-containing crude product was repeatedly washed with water and, after a reduction in the conductivity of the washing water, was post-purified with dilute sulfuric acid and a little hydrogen peroxide.

EXAMPLE 2

The experiment of Example 1 was repeated with addition of 25% of the quantity of $K_2TaF_7$ of inert salt (NaCl), which substantially corresponds to the starting conditions of Example 1 of DE-C 25 17 180. It was found that the effect of the inert salt on the kinetics of the reduction process was reflected in the fact that, after the onset of the reaction, the measured surface temperature of the reaction mass rose to at most only 530° C. To this extent, the inert salt has a reaction-retarding effect which is beneficial to the solution of the problem addressed by the invention. The crude reaction product was similar in quality to that of Example 1 and was further processed in the same way.

EXAMPLE 3

377 g sodium metal were introduced in molten form into and heated in an gas atmosphere (argon) to 350° C. in a cylindrical, stainless steel reactor provided with an external heating system and with a hermetically sealable cover with openings for the stirrer and for the introduction of reduction metal, tantalum salt and for purging with inert gas. 1253 g $K_2TaF_7$ were continuously introduced with stirring into the metal melt in such a way that the maximum reaction temperature of 500° C. was not exceeded inside the retort. Addition of the tantalum salt was followed by an after-reaction time of 30 minutes to enable the reaction of the alkali metal to be completed. After the crucible had been cooled to room temperature, the granular, free-flowing product was introduced into water containing a little sulfuric acid and then washed with distilled water until it showed a neutral reaction. Finally, the moist metal powder was dried at 110° C. in a vacuum drying cabinet.

EXAMPLE 4

The retort used in Example 3 was used to carry out the experiment by this equally well-known method; on this occasion, however, the reduction reaction was limited to a peak temperature of 600° C. 1500 g decrepitated $K_2TaF_7$ (cf. Example 1) and 750 g NaCl were introduced into the retort and the mixture was slowly heated with stirring to 400° C. in a gentle stream of argon. Liquid sodium was introduced into the retort in small (undefined) portions, steps being taken to ensure that the temperature in the retort rose by only at most 100° C. with each portion, so that a temperature of around 500° C. was not exceeded. With the heating jacket lowered, the retort was occasionally cooled with a cold air fan.

After 450 g liquid sodium had been introduced, the reaction was completed at 500° C. while stirring for 20 minutes and the batch cooled. The free-flowing product was shaken from the retort without any mechanical assistance and was subjected to the washing process described above.

EXAMPLE 5

The experiment of Example 1 was carried out with $Na_2TaF_7$ and 25% of the quantity of $Na_2TaF_7$ of inert salt (NaCl), which corresponds to the starting conditions of Example 1 of DE-C 2 517 180.

As in Example 2, the inert salt affects the kinetics of the reduction process. In this case, a maximum surface temperature of the reaction mass of 550° C. was obtained after the beginning of the reaction.

As in Example 2, the inert salt again reduces the reaction temperature. The crude reaction product had a slightly more solid structure than in Example 2 and was further processed in the same way.

COMPARISON EXAMPLE

A state-of-the-art tantalum metal powder for capacitor applications, of the type currently marketed by Applicants as the highly capacitive Ta powder PL-22000, was used for comparison.

TABLE 1

| Product | Example no. 1 | Example no. 2 | Example no. 3 | Example no. 4 | Example no. 5 |
|---|---|---|---|---|---|
| Material properties of the end products — Test results of the untreated comparison products (primary product) | | | | | |
| Mean grain size (FSSS) (micrometers) | 0.7 | 0.5 | 0.3 | 0.4 | 0.6 |
| Apparent density (Scott) (g/inch$^3$) | 13.5 | 11.6 | 10.1 | 10.8 | 12.1 |
| BET surface (m$^2$/g) | 1.75 | 2.20 | 3.50 | 2.75 | 1.85 |

TABLE 2

| Product | Example no. 1 | Example no. 2 | Example no. 3 | Example no. 4 | Example no. 5 | Comparison Example |
|---|---|---|---|---|---|---|
| Investigation of the crude powder conditioned in an inert gas atmosphere at 800° C. with addition of magnesium (deoxidized agglomerates) | | | | | | |
| Mean grain size (FSSS) (micrometers) | 1.6 | 1.3 | 1.0 | 1.2 | 1.5 | 1.2 |
| Apparent density (Scott) (g/inch$^3$) | 20.8 | 18.6 | 18.0 | 19.2 | 19.8 | 20.5 |
| BET surface (m$^2$/g) | 0.75 | 0.83 | 1.05 | 0.96 | 0.78 | 0.65 |
| Flow behavior* | (+) | (+) | (+) | (+) | (+) | (−) |

*Flow behavior is mentioned in accordance with ASTM B213-77; a 50 g sample of tantalum powder is allowed to flow out through a conical metal funnel formed with defined outlet openings. The result is expressed as the flow time in seconds. In the present case, flow behavior was evaluated by whether the sample flowed freely without interruption through a 0.1 inch opening. (+) = free-flowing; (−) = non-flowing.

TABLE 3

| Product | | Example no. 1 | Example no. 2 | Example no. 3 | Example no. 4 | Example no. 5 | Comparison Example |
|---|---|---|---|---|---|---|---|
| Chemical analyses | | | | | | | |
| Oxygen | (%) | 0.19 | 0.22 | 0.25 | 0.24 | 0.20 | 0.25 |
| Nitrogen | (%) | <0.01 | <0.01 | <0.01 | <0.01 | <0.1 | <0.01 |
| Hydrogen | (ppm) | <50 | <50 | <50 | <50 | <50 | <50 |
| Carbon | (ppm) | 30 | 36 | 41 | 33 | 35 | 70 |
| Potassium | (ppm) | 3 | 5 | 7 | 6 | <3 | 210 |
| Sodium | (ppm) | 18 | 21 | 18 | 22 | 25 | 125 |
| Iron | (ppm) | <5 | 8 | 12 | 13 | <5 | 40 |
| Chromium | (ppm) | <3 | <3 | <3 | <3 | <3 | <3 |
| Nickel | (ppm) | <3 | <3 | <3 | <3 | <3 | <3 |
| Magnesium | (ppm) | <5 | <5 | <5 | <5 | <5 | 50 |

TABLE 4

| Product | Example no. 1 | Example no. 2 | Example no. 3 | Example no. 4 | Example no. 5 | Comparison Example |
|---|---|---|---|---|---|---|
| Sintered density (g/cm$^3$) | 5.3 | 5.4 | 5.5 | 5.3 | 5.3 | 5.1 |
| Capacitance yields: | | | | | | |
| Specific charge (mC/g) | 25.5 | 28.5 | 30.0 | 28.5 | 26.0 | 22.5 |
| Vol.-specific charge (mC/ml) | 135 | 154 | 165 | 151 | 138 | 115 |
| Specific leakage current ($\mu$A/g) | 2.1 | 2.8 | 3.6 | 2.8 | 2.3 | 5.1 |
| Relative leakage current (nA/$\mu$C) | 0.08 | 0.1 | 0.12 | 0.1 | 0.090 | 0.22 |
| Breakdown voltage (Volts) | 150 | 130 | 130 | 130 | 145 | 120 |

| Results of electrical tests: | |
|---|---|
| Parameter: compact density: | 5.0 g/cm$^3$ |
| anode weight: | 0.2 g |
| sintering: | 1500° C., 20 minutes |
| forming: | 70 volts, 70 mA/g at 60° C. |

What is claimed is:

1. Earth acid metal powders consisting of agglomerates for powder metallurgical applications for the production of sintered compacts, wherein the mean grain size of the agglomerates is no more than 2.0 $\mu$m, determined by the Fisher Sub-Sieve Sizer, and wherein the agglomerates consist of primary individual agglomerated particles of mean grain size of no more than 0.7 $\mu$m.

2. Earth acid metal powders as claimed in claim 1 wherein 100% of the agglomerates pass through a 250 $\mu$m mesh sieve.

3. Earth acid metal powders as claimed in claim 1 which have a total alkali content of at most 30 ppm, and a potassium content not exceeding 10 ppm.

4. Earth acid metal powders as claimed in claim 1 which have a total content of iron, chromium and nickel of at most 30 ppm, and which have chromium and nickel contents not exceeding 5 ppm in either case.

5. Earth acid metal powders as claimed in claim 1 wherein the earth acid metal is tantalum.

6. Earth acid metal powders as claimed in claim 5, which when sintered for 20 minutes at 1500° C. have a specific electrical charge of more than 25 millicoulombs per gram and a volume-related charge of at least 120 millicoulombs per cubic centimeter.

7. Earth acid metal powders as claimed in claim 5, wherein the specific surface of the primary tantalum powder as measured by the BET method is at least 1.5 square meter per gram.

8. A process for the production of the earth acid metal powders claimed in claim 1 which comprises reacting alkali/earth acid double halides or earth acid halides with an alkali metal, wherein the reaction is carried out so that the reaction mixture is not a melt.

9. A process as claimed in claim 8, said halides contain tantalum or niobium and the reaction is carried out at temperatures below 600° C.

10. A process as claimed in claim 9 wherein the reaction temperatures is from 400° to 600° C.

11. A process as claimed in claim 9, wherein the halides are alkali heptafluorotantalates or alkali heptafluoroniobates and the reacting alkali metals are liquid alkali metals.

12. A process as claimed in claim 8 wherein the reaction is in the presence of inert alkali metal halides.

13. A process as claimed in claim 8 wherein the halide is potassium heptafluorotantalate and the reacting alkali metal is liquid sodium.

14. A process as claimed in claim 8 wherein the halide is sodium heptafluorotantalate and the reacting alkali metal is liquid sodium.

15. Sintered electrodes of the metal powders as claimed in claim 1 which after being sintered for 20 minutes at 1500° C. have a specific electrical charge of more than 25 millicoulombs per gram and a volume-related charge of at least 120 millicoulombs per cubic centimeter.

16. Sintered electrodes according to claim 15 which are anodes.

17. Electrolytic capacitors which contain the earth acid metal powders as claimed in claim 1.

18. Electrolytic capacitors according to claim 17 wherein the earth acid metal is tantalum.

* * * * *

UNITED STATES PATENT AND TRADEMARK OFFICE
CERTIFICATE OF CORRECTION

PATENT NO. : 4,954,169

DATED : September 4, 1990

INVENTOR(S) : Dieter Behrens

It is certified that error appears in the above-identified patent and that said Letters Patent is hereby corrected as shown below:

Item "[73]" on the patent title page should correctly read as follows.

--[73] Assignee: Hermann C. Starck
Berlin GmbH & Co. KG,
Berlin, Germany--

Signed and Sealed this

Twenty-fifth Day of August, 1992

*Attest:*

DOUGLAS B. COMER

*Attesting Officer*  *Acting Commissioner of Patents and Trademarks*